United States Patent Office 3,843,436
Patented Oct. 22, 1974

3,843,436
METHOD OF PRODUCING SYNTHETIC LEATHERS
Kisaku Yanagida, Tokyo, Ryuichi Kato, Chiba, Tadao Suzuki, Tokyo, and Yoshio Takano, Chiba, Japan, assignors to Kyowa Leather Cloth Co., Ltd., Tokyo, Japan
Filed June 15, 1972, Ser. No. 262,984
Int. Cl. B32b 31/00
U.S. Cl. 156—148                            6 Claims

ABSTRACT OF THE DISCLOSURE

Synthetic leather is produced by coating a polymer composition on the surface of a release substrate. The polymer solution coated on the release substrate which is made of a woven fabric of polyethylene terphthalate is subjected to a solvent elimination in a coagulating bath to form a polymer layer having uniform micropores within the inside. In a modified method, two sheets of said release substrates are used, and the polymer solution is introduced into the space between the sheets, passed through a coagulating bath to effect coagulation. Said release substrate has the almost smooth surfaces, has the adhesiveness to the polymer as well as the ability to peel the polymer and is permeable of the polymer solvent.

---

This invention relates to a method of producing synthetic leathers. More particularly, it relates to a method of forming a polymer film having uniform micropores by coating a polymer composition on a release substrate made of a woven fabric of polyethylene terphthalate, thereby easing the elimination of the solvent upon coagulation.

When a polymer solution is made into a wet layer and soaked in a non-solvent of the polymer (usually water) which is freely compatible with the solvent of the polymer solution, the layer is coagulated by the interchange of the solvent and the non-solvent into a porous film having continuous pores. The thus obtained film is dried and used as a substitute for a leather material. Such a method is generally called a method for producing synthetic leathers by a wet process.

Usually, a synthetic leather comprises the combination of a porous film obtained according to the above described method and a fibrous base material, and where their respective functions are combined, it is utilized as a substitute for natural leather. There have been practiced generally two different ways of producing synthetic leathers by the wet process. One way comprises coating a polymer solution directly on a base material, subjecting the coated layer to a wet coagulation and drying the resulted film (hereinafter referred to as "direct method"). Another way comprises a method where a synthetic leather is prepared by coating a polymer solution on a release substrate; subjecting the coated layer to a wet coagulation; peeling the resulted film from the release substrate; and after drying laminating the film with a base material (hereinafter referred to as "Laminating method").

The direct method is disadvantageous in that when a coarsely woven fabric is used as the base material, the polymer solution penetrates through the meshes, while when the base material is a finely woven, thick fabric, the base material fabric is soaked in a coagulating liquid along with the coated layer which results in a long time being required for drying.

On the other hand, the laminating method is easily effected by producing a porous film in large quantities and laminating the film with various fibrous base materials.

However, the conventional laminating method has still some disadvantages. According to the conventional wet process, a porous film is obtained by applying a solution of a polymer, such as polyamide, polycarbonate, polyurethane, polyamino acid, polyurea, etc. to a release substrate to result in a skin layer and soaking the layer in a non-solvent (water) which is compatible with the solvent of said polymer solution to effect coagulation. In this process, a glass plate, metal plate, paper, film or the like has been used as the release substrate. However, these release substrates are greatly disadvantageous in either the formation or the production of a porous film. This is the major reason the laminating method has heretofore been scarcely employed and the direct method has been compelled to be employed with all of its disadvantages.

More specifically, the above mentioned release substrates are disadvantageous in that:

(1) These substrates cause ill effect upon the formation of films because they are non-porous.

(2) Since these substrates are poor in flexibility, they can not be prepared in the form of belt, therefore, no continuous commercial operation for the production of film can be designed.

(3) Though this is most important for a release substrate, a film has to have an appropriate adhesiveness to the substrate as well as the property of appropriately peeling from the substrate. These properties seem to be antagonistic, however, the former property is the adhesiveness during the course of coating of a polymer solution on the substrate, coagulating, drying, etc., and the latter property is the peeling property of the formed film from the substrate. For example, when a metal plate is used as the substrate, it has the above-mentioned disadvantage (1) and in addition the formed film adheres strongly to the surface of the metal plate requiring much power to peel. Accordingly, when a metal plate is used, the resulting film is inevitably thick.

Also a synthetic resin film has the disadvantage (1) similar to the metal plate. Besides, it has the disadvantage of suffering fine scratches on the surface after being used 5 to 6 times, which results in the reduction of the ability to peel the film, and, in the extraction case, the breaking or damage of the film upon peeling, and the like disadvantages.

Further, among the synthetic resin sheets, there are some excellent in the peeling ability such as, for example, Teflon film, etc. However, when such a release substrate with extremely excellent peeling ability is used, it is practically impossible to form a sheet by the wet process because of the difficulty of coating a polymer solution thereon.

In addition to the above, the following should be taken into consideration in selecting the release substrate for a wet process.

(a) A release substrate is required to have a high tensile strength but not be degraded under both the wet and dry conditions since it is exposed to the specific conditions, that is, the coating is carried out in the air (dry) but the coagulation is effected in a liquid (wet).

(b) A release substrate is required to have constant elongation under both the dry and wet conditions like in the case with the preceding (a), and also have the same elongation recovery in both the dry and wet states.

(c) Since a polymer solution and a coagulating liquid are often heated, a release substrate is required to have a higher softening point than the polymer solution and the coagulating liquid.

(d) A release substrate, once equipped, is required to deteriorate less with the lapse of time.

(e) A release substrate is required not to be damaged by a polymer solution or coagulating liquid.

(f) A release substrate is required to be resistant to worm-eating.

(g) A release substrate is required to be resistant to molds.

One object of the present invention is to provide a release substrate free from any problem in respect to the porous nature, flexibility and peeling ability, as well as from any other viewpoint, and at the same time to provide a new method of producing synthetic leathers by utilizing the release substrate. Another object of the present invention is to obtain a sheet like substance of uniform and constant moisture permeability. Further object of the present invention is to provide the production of a quite effective substitute for a natural leather, by laminating a porous film with a fibrous base material suitable for the end uses.

The present invention relates to a method of producing a synthetic leather obtained by laminating a porous film produced by wet process with a base material, which comprises:

(1) applying a polymer solution to a release substrate, which is prepared by heat-pressing the surfaces of a plainly woven fabric of polyethylene terephthalate at a temperature below its melting point, (2) spreading the resulted polymer solution into a sheet, (3) subjecting the resulted sheet to a conventional wet coagulation to obtain a porous film, (4) peeling the porous film from the release substrate, (5) drying the resulted porous film, and (6) laminating the porous film with a fibrous base material.

It is also directed to the formation of a porous film having uniform micropores by using two sheets of said release substrate and introducing a polymer solution between the space of the sheets to develop into a sheet.

RELEASE SUBSTRATE

Polyethylene terephthalate is most suitable for the material of the release substrate. The present inventors have initially prepared woven fabrics from various fibers and studied the physical and chemical properties of the thus obtained fabrics. They have finally selected the fabric of polyethylene terephthalate fibers actually as a release substrate which satisfies the above-mentioned conditions (a) to (g). Polyethylene terephthalate is obtained by the reaction of terephthalic acid with ethylene glycol and has a melting point of approximately 265° C. The polyethylene terephthalate is subjected to melt spinning and drawn to prepare filaments of up to 10 deniers. The filaments are twisted together into 80 to 260 deniers. The twisted filaments (hereinafter referred to as "yarn") means that they do not separate into each filament when left as they are. Here, when the yarn has a thickness of less than 80 deniers, the resulting fabric (the release substrate) is poor in stiffness. Therefore, the thickness of 80 deniers provides one limit from the viewpoint of the physical strength of the release substrate.

On the other hand, when a yarn of more than 260 deniers is used, a poorly flexible woven fabric is obtained therefrom, and the above described disadvantage (2) can not be overcome. Further, the thickness of a filament is preferably up to 10 deniers where a filament has a thickness of more than 10 deniers, the solvent and the nonsolvent can not be smoothly interchanged. In this respect, since the interchange is effected not only through the meshes but also through the yarns themselves, it is preferred that the filaments constituting the yarn are thin.

A plainly woven fabric is prepared from said yarns in a density of at least 80/inch preferably 80 to 130/inch for the warps and at least 70/inch, preferably 70 to 110/inch for the woofs (the density less than these results in large meshes of the fabric and the polymer solution permeates through the resulting fabric). The surface of the thus prepared woven fabric is subjected to heat pressing at a temperature below the melting point of the material filament to give a finished product.

The heat pressing is carried out, for example, by passing a woven fabric between a pair of iron rolls which are heated by introducing steam therein. In this operation, the steam to be introduced is preferably a saturated steam having a pressure of 10 to 15 kg./cm.$^2$ and the rolls have a linear pressure of 20 to 30 kg./cm.

Figures 1, 2:
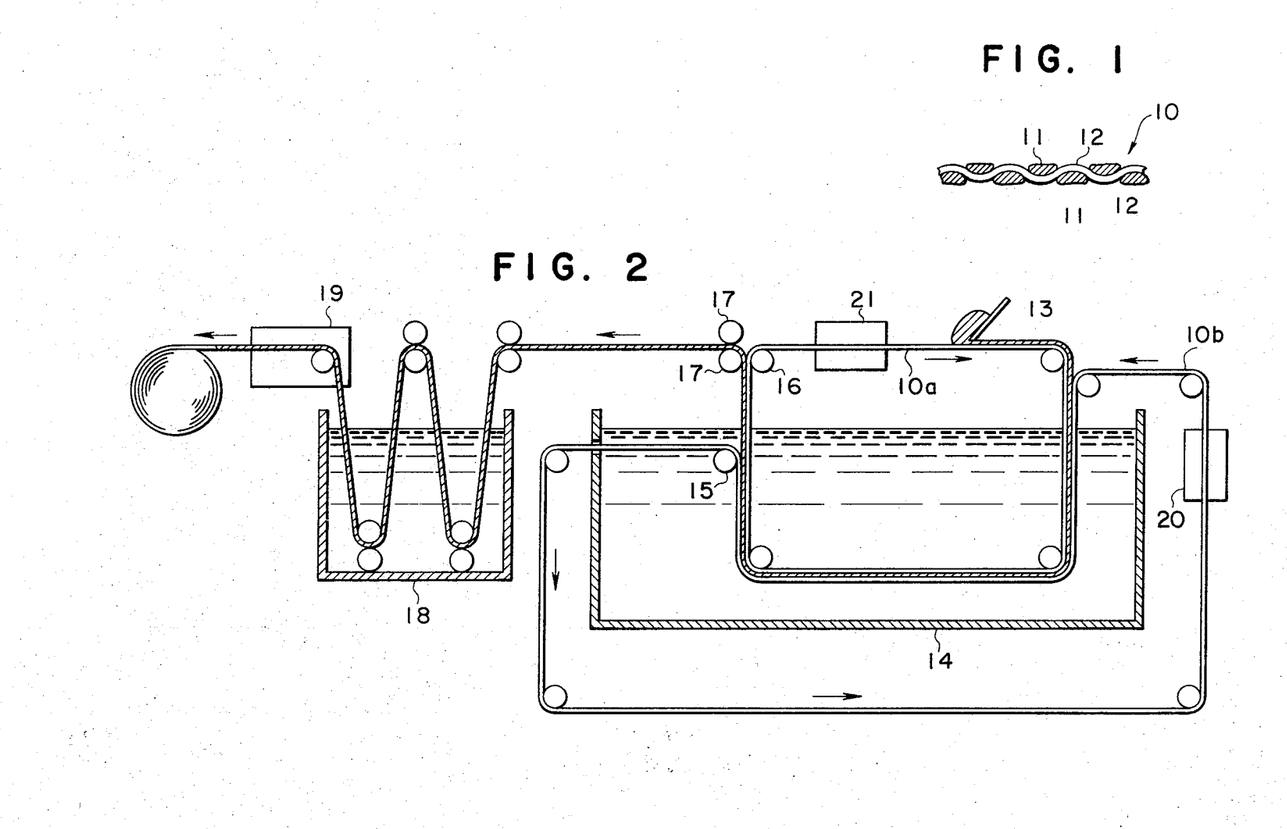
FIG. 1 is an enlarged sectional view of a release substrate of the present invention.
FIG. 2 is a sectional view of an apparatus used in carrying out a method according to the present invention.

The heat pressing is desirably not carried out at a temperature above the melting point of the raw material filaments since the pressing is not directed to the adhesion of filaments by melting. As the enlarged view is illustrated in FIG. 1, the surfaces of a warp and woof 11 and 12 of the woven fabric 10 are smoothed to a certain extent by the heat pressing. The woven fabric obtained according to the method described above has fine meshes and the microscopically smooth surfaces. The thus prepared fabric is used as the release substrate and a synthetic polymer solution in an organic solvent is applied to the release substrate to develop into a sheet.

SYNTHETIC POLYMER

The above-mentioned synthetic polymer includes any synthetic polymer used for the formation of a polymeric porous film by a wet coagulation process. The typical examples are given in the following Table 1.

They can also be used in a proper combination.

TABLE 1

| Polymer | | Typical solvent |
|---|---|---|
| Polyamide | 6-, 6.6-, 6.10-, 11-nylons | Phenol, formic acid, cresol, mixed solution, of calcium carbonate and methanol. |
| | Methoxymethylated 6-nylon, copolymers thereof with the above nylons. | Methanol, ethanol. |
| Polyvinyl, vinyl polymers. | Vinyl chloride | Mixed solution of benzene and acetone, dichloroethane. |
| | Vinyl acetate, polystyrene polymethylenemethacrylate | Benzene, toluene, xylene, monochlorobenzene, tetrachloroethane, methyl acetate. |
| | | Ethylbutylene dioxane. |
| | Polyacrylonitrile | DMF, rhodanide solution. |
| Polycarbonate | | TCE, ethylene chloride, DMF, dioxane, monochlorobenzene. |
| Polyurethane | | DMF, DEF, DMAc, chlorobenzene, toluene, xylene, ethylacetate, THF, MEK, DMSO. |
| Polyurea | | DMF, methylene chloride. |
| Polyamino acid | Polyglutamic acid, γ-alkylester | Chloroform, methylene chloride, dichloroethane, TCE. |

NOTE.—DMF=dimethylformamide; DEF=diethylformamide; DMAc=dimethylacetamide; THF=tetrahydrofuran; MEK=methyl ethyl ketone; DMSO=dimethylsulfoxide; TCE=trichloroethane.

HETEROGENEOUS MIXED SOLUTION

Most preferably used are polyurethane and a mixture thereof with other resins or various powdery fillers. For example, it has been known from the disclosure of U.S. Pat. 3,190,766 to prepare a polymeric film from a mixed solution of a polyurethane and a polyvinyl chloride by a wet process. Further, it has been found that an improved mixed solution is effective for the formation of a uniformly porous film. This improvement has been achieved by the use of a heterogeneous solution comprising a combination of a polyvinyl chloride or polymer of derivatives of vinyl chloride, a polyurethane compatible therewith and a polyurethane incompatible therewith. It will be explained more in detail below.

It is a known fact that the compatibility and incompatibility between polymers are most affected by the molecular structure of each polymer. In this connection, it has been found that when a urethane polymer is viewed from its structural components, i.e. the polyol component, diisocyanate component and chain extender component, the polyol component exerts the biggest effect upon compatibility. The compatibility is also affected depending upon the carbon numbers and the kind of polar group of a reaction retarder such as monoamines, alcohols, monoisocyanates, etc., and other factors. For example, Table 2 below shows the variation of the compatibility depending upon the components of polyurethane in the case of a polyvinyl chloride having a degree of polymerization of 750.

TABLE 2

| Glycol of polyester glycol (adipic acid is used) | Chain extender | Compatibility |
|---|---|---|
| E G(7 moles)—P G(3 moles) | Xylenediamine | Incompatible. |
| E G(7 moles)—1,4 B D(3 moles) | do | Do. |
| E G(7 moles)—1,6 H D(3 moles) | do | Compatible. |
| 1,4 B D | do | Do. |
| 1,6 H D | do | Do. |
| E G(7 moles)—P G(3 moles) | Hydrazine ethylenediamine. | Incompatible. |
| E G(7 moles)—1,4 B D(3 moles) | do | Do. |
| E G(7 moles)—1,6 H D(3 moles) | do | Compatible. |
| E G(7 moles)—N G(3 moles) | do | Do. |

NOTE.—
E G=ethylene glycol; 1,4 BD=1,4-butanediol; NG=neopentyl glycol; P G=propylene glycol; 1,6 HD=1,6-hexanediol.
In each case, diphenylmethane diisocyanate is used as the isocyanate.

The most effective for the formation of a uniformly porous sheet is obtained by mixing a polyvinyl chloride with a combination of a urethane polymer indicated as "incompatible" and that indicated as "compatible" in the foregoing table.

The ratio of the compatible urethane polymer and the incompatible urethane polymer in the polymer solution obtained above is preferably in a range of 50:50 to 10:90 by weight. When the ratio of the incompatible urethane polymer in the polymer solution is less than this range, the polymer solution is not effective for the formation of uniform micropores. Also when the ratio exceeds the above-defined upper range, the viscosity of the polymer solution changes with the lapse of time during the long storage, often causing an inconvenience for such operations as the deformation, filtration, etc.

On the other hand, it is preferable that the ratio of the urethane polymer and the vinyl chloride polymer in the polymer solution ranges from 95:5 to 55:45. Generally when the ratio of the vinyl polymer is increased, the amount of the incompatible urethane polymer rather than the compatible one may be decreased to obtain a better result. It is a matter of course that a polymer solution containing the vinyl polymer in a ratio less than defined above is less effective for the formation of uniform micropores. Also the use of the vinyl chloride polymer in excess of the above range results in the considerable rigidity of the product which is far from the leathery feel.

The desire to obtain a uniformly porous film has further led to the conclusion that it is also effective for the formation of a uniformly porous film to add a solid having a diameter of up to 20μ of calcium carbonate, alumina, silica, magnesium, magnesium carbonate, magnesium hydroxide, calcium sulfate, graphite or titanium oxide, alone or in combination, to the polyurethane polymer solution. Further, in this respect it has been found that when the amount of the additive is in a range from 30 to 50% by weight based on the total solids in the solution not only a uniform microporous film is formed but also the film shows the maximum tensile strength without deteriorating other physical properties, for example, a flexing strength at a room temperature and at low temperature, and a moisture permeability.

In the case a suede-like synthetic leather is required, a method described in U.S. Pat. 3,284,274 has been known as the typical one. This method comprises forming honeycomb-like voids in the coating layer and disclosing it by grinding off the surface skin. However, this method has not been approved. Repeated studies have been made in order to obtain a suede-like synthetic leather having a uniformly microporous structure. As a result it has been found that the object is attained by mixing the polymer solution with a powder of pulp, polyethylene, polypropylene, natural leather, rayon, cotton or the like having a diameter of 40 to 200μ. An actual operation of the steps will be explained in examples below.

The foregoing are the compositions of the polymer solution used in the present invention.

The polymer solution prepared above is coated on a release substrate in a desired thickness by means of a doctor knife coating, roller coating, spray coating, etc. The coated layer is soaked in a coagulating bath in the conventional manner to be coagulated. A coagulating bath comprises a liquid which is non-solvent for the polymer but miscible with the solvent of the polymer solution. Usually water or methanol is used as the coagulating liquid.

The porous sheet obtained by the above described wet coagulation process is then peeled from the release substrate and dried. Since a specific release substrate is used in the method of the present invention, the sheet can be very smoothly peeled from the release substrate.

The Table 3 shows the peeling strength, against the synthetic polymer film, of the release substrate used in the present method in comparison with the conventional release substrates.

TABLE 3
[Comparison of peeling strength (g./5 cm.)]

| Number of times used | 1 | 2 | 5 | 10 |
|---|---|---|---|---|
| Teflon film | 25–35 | 25–35 | 25–35 | 25–35 |
| Stainless steel | 600–700 | 600–700 | 600–700 | 600–700 |
| Polyester film | 400–500 | 700–800 | (a) | (b) |
| Release substrate of the present invention | 100–150 | 120–170 | 120–170 | 120–170 |

ᵃFilm partially broken.  ᵇFilm broken.

NOTE.—
1. Each sample was coated with a DMF solution containing 25% polyurethane in a thickness of 1 mm.
2. Coagulation was carried out in a water bath (40–60° C.) for 5 to 10 minutes.
3. As the release substrate of the present invention, a fabric woven in a density of 116/inch for the warps and 80/inch for the woofs using yarns of 100 denier was used.

Peeling strength varies depending upon the thickness and kind of film. However, as mentioned above Teflon film is not suitable for a release substrate because of its too small a peeling strength while stainless steel also is unsuitable because the peeling strength is too large. Further, it is observed in the above table that polyester film increasingly becomes frail by reusing and the film is broken upon reusing for the fifth time.

On the other hand, the release substrate of the present invention has an adequate peeling strength and it remains constant upon repeated reuse.

According to the thus described method of the present invention, the wet coagulation of the synthetic polymer is effected from both sides. Consequently, pores with the enhanced uniformity are obtained as well as shortened coagulation time.

Also, in the present invention, since the specific cloth used as the release substrate is excellent in durability as well as in flexibility as compared with the conventional release substrates, it can be used without difficulty in complicated operation, especially for a curved portion. Accordingly, it can be advantageously used in a commercial operation as an endless belt, resulting in a remarkable improvement in the productivity.

USES OF THE PRODUCT

The porous film thus obtained is laminated with various fibrous base materials suitable for the end uses to obtain a synthetic leather. For example, thin cloths, knitted fabrics, fluffed cloths are used as the base material when clothing is the end use and thickly knitted fabrics when furniture is the end use. Further, when the end use is shoe leather, a non-woven fabric is used as the base material. This non-woven fabric is prepared by binding fibers consisting mainly of polyethylene terephthalate using a binder. The laminating is achieved by coating a binder on the fibrous base material or on the surface of the porous film, adhering them to each other and effecting the adhesion in an oven at a temperature of 80 to 150° C. The examples of the binder are 1 component system or 2 component system of urethane elastomers, an emulsion or solution in a solvent of natural rubber or synthetic rubber, such as NBR (nitrile butadiene rubber) or SBR (styrene butadiene rubber), or other vinyl polymers (for example, a copolymer of vinyl chloride and vinyl acetate).

As described in detail above, the synthetic leather obtained in the present invention has completely overcome the disadvantages possessed by the conventional direct method. The achievement of the present invention can be attributed to the development of an excellent release substrate which has been the fatal problem in carrying out the laminating method. As mentioned above, the release substrate of the present invention satisfies all of the conditions that should be possessed by a release substrate for the production of a porous film by a wet process. Further, the advantage of the laminating method of the present invention over the direct method is characterized especially in that the fibrous base material does not undergo substantial deterioration in the case of a synthetic leather for clothing and upholstering of a chair.

Considered from the view point of shoe leather use, the product of the present invention is characterized by exceedingly uniform micropores in respect of the porous film structure whereas in the direct method, gigantic pores are scattered throughout the film. The product obtained according to the present laminating method has a desirable feel since the fibrous base material is not permeated with the polymer solution (this is apparent when the tear strength of the products obtained by the respective methods is compared). With these advantageous characteristics, the synthetic leathers of the present invention when made into products commend itself to the users as comfortable to wear or to sit. Further, the present synthetic leather is characterized by the distinctly excellent properties in actual physical requirement such as strength, etc.

As described above, the present inventors have succeeded in coagulating a polymer solution coating layer from both sides by coating the polymer solution on the moisture permeable release substrate, improving a disadvantage of the direct method in which coagulation is effected from only one side. The basic invention* is accomplished by the finding.

However, in this case though the coated layer is coagulated from both sides, it is still inevitable that the coagulating speed is, to some extent, different between the surface (which contacts with a coagulating bath) and the reverse side (which contacts with the release substrate) of the coated layer. The present inventors have further completed an invention to obtain a uniformly microporous film by carrying out a method where two sheets of said release substrates are used, and which comprises introducing a polymer solution into the space between the two sheets of the release substrate and then carrying out a wet coagulation. In this method, a coagulating liquid in a coagulating bath permeates through both sheets of the release substrate simultaneously and at an equal speed. As the result, the coagulation proceeds from both sides at an equal speed while forming entirely uniform micropores without gigantic pores. More specifically, the release substrate used in the method of the present invention is a very finely woven fabric having a high density, and the firmness is further enhanced by a heat pressing. It may better be described as a microporous release substrate rather than as a cloth. Therefore, the polymer solution does not permeate into it while it facilitates the interchange of the solvent of the polymer and the coagulating liquid by selectively permeating the coagulating liquid.

However, since said release substrate is essentially a woven fabric, it has an appropriate anchor effect upon the synthetic polymer solution. Therefore, when the polymer is coagulated, the cohesive force is repressed by the adhesiveness of the polymer to the release substrate resulting in a close coagulation of the polymer and a prevention of the formation of a skin.

In the FIG. 2 is illustrated an apparatus to be employed in carrying out the above-described method.

Referring to FIG. 2 of the drawings, a polymer solution is fed on an endless belt 10a made of the release substrate shown in FIG. 1 by means of a feeding means 13 (besides the knife coating means shown in the figure, any of the conventional means such as roller coating, slit extrusion, spray coating, etc. is applicable) to form a liquid layer. The coated layer is soaked in a coagulating bath 14 while its surface is being supported by a release substrate 10b made of the same material as 10a to effect a gelation. Then the release substrate 10b is peeled off with the aid of a rubber roll 15 and further the remaining release substrate 10a is peeled off with the aid of a pair of rubber rolls 16 and 17. The resulting film is soaked in a water bath (18) to effect complete elimination of the solvent, passed through a dryer 19 and rolled, 20 and 21 are dryers for the respective release substrates, which had better be in a dry state when contacting with the polymer solution to prevent an uneven surface of the film. It is possible to equip a moistening means at a certain stage from the feeding means 13 up to the coagulating bath.

Alternatively, though the apparatus is not illustrated, a polymer film of the present invention may be prepared in the following manner. That is, a wire net is placed around a rotating drum and further, a sheet of the release substrate of the present invention is placed over the wire net. A polymer solution is fed onto the surface of the release substrate by means of a feeding means to form a liquid layer. The coated layer is soaked in a coagulating bath while the surface is being supported by another sheet of the same release substrate to effect gelation. The resulting film layer is peeled from the former sheet of the release substrate with the aid of a rubber roll onto a belt conveyor of wire net and from the latter sheet of the release substrate with the aid of a pinch roll, is passed through a dryer and reeled. In this manner, a uniform pressure can be applied to the polymer solution layer until the coagulating step.

The characteristics of the porous sheet obtained by a specific method is explained below in comparison with those obtained by other methods.

A porous sheet used as a sample is prepared by coating a 25% polyurethane solution in DMF on a substrate in a thickness of 1 mm. with a knife at room temperature

---

*The basic invention comprises coating a polymer composition on the surface of a specific release substrate having moisture permeability and coagulating the coated layer from both sides by soaking in a coagulating bath. (Fig. not shown, see Examples 1 to 5.)

and coagulating the coated layer. The polyurethane is prepared by a melt polymerization from:

| | Parts (by weight) |
|---|---|
| Diphenylmethane diisocyanate | 50 |
| Polyethylene adipate (molecular weight: 2,000) | 200 |
| 1,4-butanediol | 9 |

(a) A liquid layer obtained by applying the polymer solution on a Tetron film (non-porous) is soaked in water having a room temperature for 3 hours to effect gelation of the polymer and extraction of the solvent.

Figure 3A:
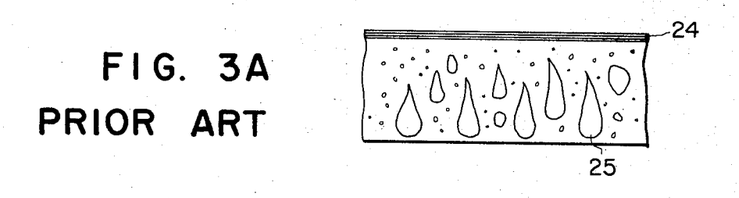
FIGS. 3A to 3D are enlarged sectional views of films of synthetic leathers.

The structure of the resulted film is illustrated In FIG. 3A. As shown in the figure, a hard, dense skin layer 24 is formed on the surface which is directly contacted with water while gigantic pores 25 tend to be formed toward the side contacting with the Tetron film. The film shows typical one-sided coagulation and the formation of gigantic pores resulted from the difference in coagulating time. Such a film is considerably poor in moisture permeability, appearance and touch. Further, since the film has poor peeling ability off the Tetron film, this method can not be put into an industrial practice.

(b) The polymer solution is coated on a release substrate used in the present invention and soaked in water having a normal temperature for 3 hours to effect gelation.

Figure 3B:
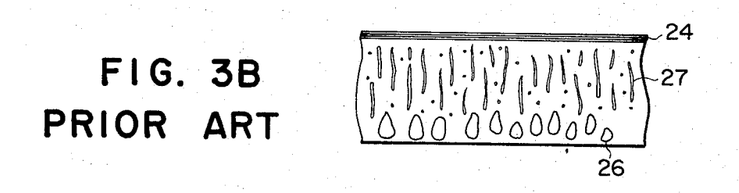

The structure of the resulted film is illustrated in FIG. 3B. As shown in the figure, a skin layer 24 is formed on the surface which is contacted with water and, though not so remarkable as in the case with FIG. 3A, voids 26 are observed on the side which is contacted with the release substrate. Voids 27 in the pillar-like state are often formed inside the film.

In this case, a film formation is effected under the conditions that one side is not covered with a cover material and the other side is contacted with the release substrate of the present invention. Though this method meets the condition of a coagulation from both sides, it is not sufficient to obtain a uniform microporous structure because of the difference of the coagulating speed on respective sides.

In the films of FIGS. 3A and 3B, because of the formation of a skin layer, difference in the flexibility is observed on the surface and on the reverse side as shown in the Table 4 below. That is, the flexibility on the surface side where the skin layer is formed has a high value, representing the hardness.

Figure 3C:
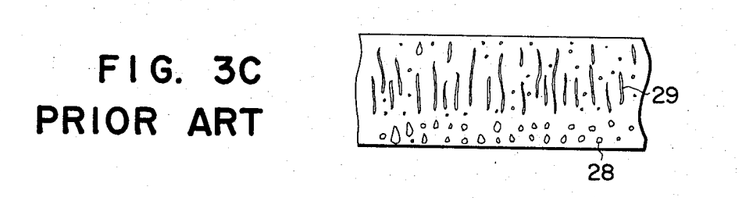

(c) A polymer solution layer on a Tetron film is covered with the release substrate used in the present invention and soaked in water having a room temperature for 3 hours to effect extraction by gelation. The structure of the film is illustrated in FIG. 3C. A skin layer is not formed on the surface which is in contact with the release substrate. Similarly to the case with the film of FIG. 3, the film has voids 28 on the side of the Tefron film and voids 29 in the pillar-like state inside the layer.

In this case, a non-pororus release substrate is used on one side and the release substrate of the present invention on the other side, and therefore the coagulation is not effected from both sides. Nevertheless, a film of enhanced properties in moisture permeability, flexibility, etc. than the film of FIG. 3B is resulted. This is attributable to an excessive slowness and gradual proceeding of the coagulation. More particularly, when a polymer solution layer is subjected to a rapid coagulation as in the case with the films of FIGS. 3A and 3B, an internal distortion of the resulting film is remarkable. Whereas in this case, a slowness of the coagulation causes good result. However such a slow coagulation is disadvantageous in an industrial practice.

(d) Specific method. The polymer solution layer supported on both sides by the release substrate of the present invention is soaked in water having a normal temperature for 3 hours to effect gelation.

Figure 3D:
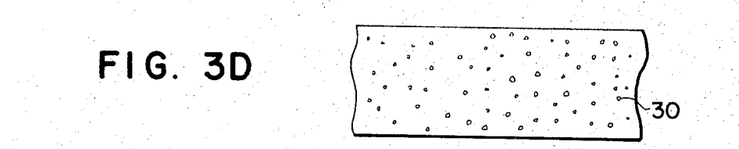

The structure of the film is illustrated in FIG. 3D. As shown in the figure, uniform micropores 30 are formed throughout the film. Therefore the film is excellent especially in its flexibility and moisture permeability. Also, since a skin layer is not formed, it has excellent toughness. Further in this case, since the film has a higher strength than the films of FIGS. 3A, 3B and 3C, and since it peels the releasing substrates smoothly, a continuous production of the film on an industrial scale is enabled.

The following Table 4 shows the properties of the foregoing films.

TABLE 4

| Method | | Touch | Moisture permeability (g./m.²/24h.) | Flexibility cantilever (mm.) Surface | Flexibility cantilever (mm.) Reverse | Tensile strength (kg./cm.) | Thickness of film (mm.) |
|---|---|---|---|---|---|---|---|
| a | Coexistence of uniform micropores and gigantic pores. | Thick skin layer on the surface; rigid. | 1,270 | 78 | 65 | 7.0 | 0.42 |
| b | Voids in the pillar-like state; gigantic pores on the lower side. | Rigid due to the skin layer | 1,540 | 69 | 66 | 8.0 | 0.44 |
| c | Voids in the pillar-like state; gigantic pores on the lower side. | Somewhat soft | 1,800 | 67 | 65 | 6.2 | 0.40 |
| d | Uniform micropores | Very soft | 2,450 | 60 | 60 | 8.2 | 0.42 |

NOTE.—Flexibility shows the length of overhang measured by cantilever method at a slope of 45. The number is the length of overhang in mm. (The smalller the value, the higher is the flexibility.) "Surface" means the upper side and "Reverse" means the lower side in Fig. 3.

Thus, according to the specific method where the polymer solution layer is supported by the specific release substrate, the film formed has structurally uniform microporous voids, has a soft touch since a surface skin layer is not formed, and has an excellent moisture permeability as well as sufficient strength. Accordingly, the method can provide very useful synthetic films as compared with the conventional ones. Moreover, since the release substrates capable of smoothly peeling off a polymer film can be used semipermanently, the continuous automatic production of polymer films on an industrial scale is enabled.

MODIFIED METHOD

If the release substrate of the present invention is used without sticking at uniform micropores, a porous film of interest can be produced by a wet process. For example, in the above described specific method or in like methods, since the polymer solution layer is pressed from both sides by the release substrates, the polymer solution initially applied (between the release substrates) is reduced in the thickness by elimination of the solvent while a wet coagulation proceeds.

Now it has been found, however, that when the coagulation is carried out while keeping the space between the two sheets of release substrate constant until the completion of the coagulation, the initially applied thickness (the thickness when the polymer is in the state of solution) is maintained in the resulting film.

In this case, the film has a voluminous feel and is used as a synthetic leather in a sense different from a uniform microporous film. The film is structurally characterized by slightly larger voids (a diameter of 80) than those of the films obtained by the ordinary methods, but without the formation of giant voids though. Accordingly, the film has a very high void content. That the thickness can be maintained even after the coagulation according to such a method (hereinafter referred to as modified method 2) is attributed to the following reasons. Generally when a coagulation is effected by the interchange of a solvent of the polymer solution and a coagulating liquid (nonsolvent), an internal distortion occurs, and this distortion results in the formation of microporous voids which remain within the film. This is the mechanism of the formation of a porous film by the wet process. In this case, the thickness of the film is gradually reduced due to a cohesive force possessed by the polymer.

Whereas, in the case of the modified method 2, since the polymer solution layer is supported by two sheets of said specific release substrate from both sides, the cohesive force of the polymer is prevented from both sides by the adhering power between the polymer and the release substrates. Also since the space between two sheets of release substrate is kept constant, the film is prevented from reducing in thickness upon coagulation. Thus upon peeling off the release substrates after the completion of coagulation, a film maintaining the initially applied thickness is formed. In other words, before the modified method 2, no attempts had been made to prevent a cohesive force of polymers and films from being submitted to reduction in thickness. Whereas in the modified method 2, the cohesive force is prevented from both sides of the polymer layer by the adhering power (to the release substrates) and, since the space between two sheets of the release substrate is kept constant, a voluminous film can be obtained after drying, involving the air which constitute a large portion of the film. Therefore, the film has excellent moisture permeability and flexibility. On the other hand, a strong adhering power between polymer and release substrate involves the problem of a poor peeling ability. In this respect, the modified method 2 provides a porous film maintaining the initial thickness upon coating by using said specific release substrate without causing such a problem.

Maintenance of initial thickness after coagulation is attained by properly utilizing two properties seemingly antagonistic to each other, i.e. a "cohesive force" and a "peeling ability" between polymer and release substrate, and the release substrate used throughout the present invention exactly meets the requirement. According to our studies, it is necessary that a release substrate has a peeling strength ranging from 50 to 700 g./5 cm., preferably from 80 to 400 g./5 cm. in the case of, for example, polyurethane-coated layer having a thickness of 1 mm. This is apparent from the Table 3.

Figure 4:
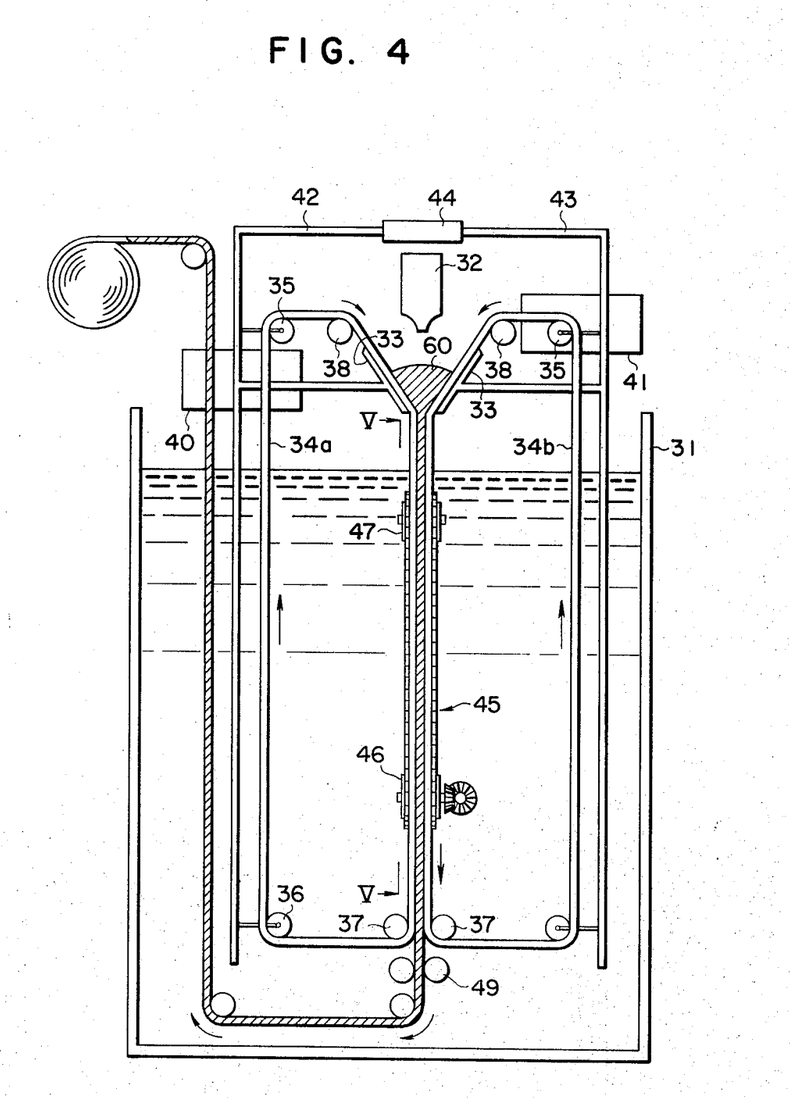
FIG. 4 is a sectional view of an apparatus used in carrying out a modified method of FIG. 2.

FIG. 4 illustrates an apparatus to be used in carrying out the above-described method. In FIG. 4, a coagulating liquid is filled in a vertical bath 31. A polymer-feeding means 32 is fixed at the upper central part of the bath 31 and a polymer solution is poured from a nozzle of the polymer-feeding means between a pair of controlling heads 33 and 33. In the bath are stretched a pair of endless belts of the said release substrate 34a and 34b having a continuous porous structure.

The endless belts of the release substrate 34a and 34b are placed face to face in parallel at the center of the bath, descended until separated near the bottom, then ascended and in this manner circulated each being guided by several pairs of guide rollers 35, 36, 37 and 38. The release substrates 34a and 34b are dried respectively by dryers 40 and 41 just after leaving the bath.

Figure 5:
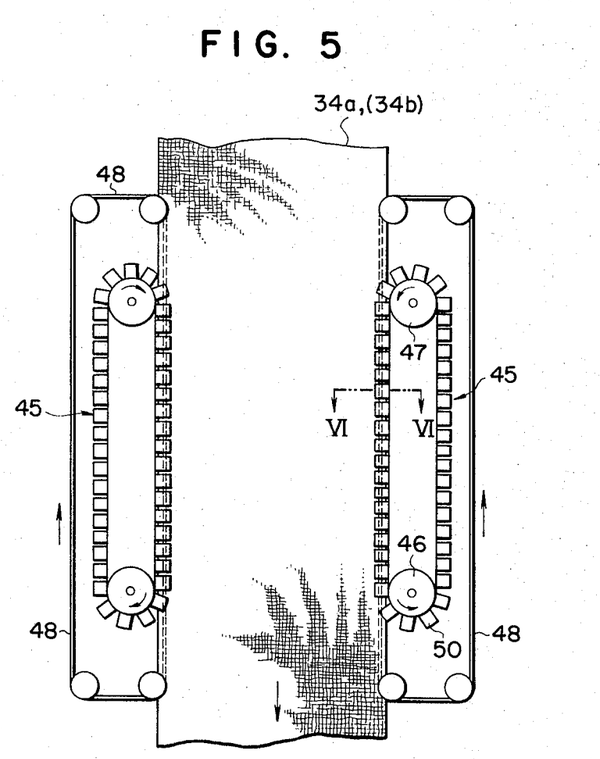
FIG. 5 is a front view in section taken as indicated by the lines and arrows V—V in FIG. 4.

The guide rollers 35 and 36 and the controlling heads 33 and 33 are respectively fixed to frames 42 and 43 and the space between the heads are controlled by the operation of a space-controlling means 44. As illustrated in FIG. 5, pin tenters 45 are provided at the joining part of the release substrates 34a and 34b to nip the selvages of the release substrates. The pin tenters 45 have a structure where many cramps 50 are connected in an endless state between sprockets 46 and 47. To keep a thickness of polymer layer constant, liners 48 are provided where the tenters support the release substrates and the tenters support the release substrate belts. While supported by the tenters, a polymer layer is soaked in a coagulating liquid or in steam. After the release substrate belts are released from the tenters, the coagulated polymer film is peeled from the release substrate belts to obtain a porous film sheet.

Figure 6:
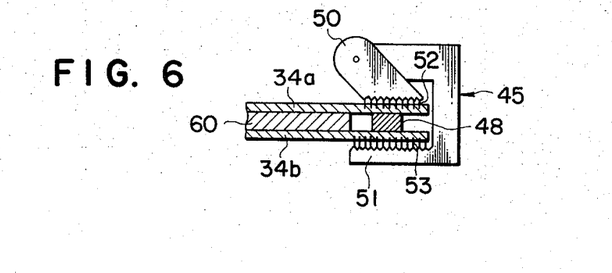
FIG. 6 is an enlarged sectional view in section indicated by the lines and arrows VI—VI in FIG. 5.

The filling thickness (thickness of film) is decided by the heads 33. After introduced into the coagulating bath 31, the release substrate belts are pulled at both of the selvages by the tenters 45. As the enlarged view is illustrated in FIG. 6, a tenter 45 has many pins 52 and 53 on the lower side of a cramp 50 and at a holder 51, and a liner 48 is fitted between the release substrate belts 34a and 34b to keep the space between the substrate belts.

The tenters hold polymer layer (60) and the release substrate belts together at the same time, and keep the space constant by the horizontal tension of the release substrate. However, it is necessary to keep the tension within an extension ratio of the release substrate of 15%. When the tension exceeds the above range, the substrate cloth is made coarse because of the stretch of the cloth, and therefore the substrate cannot satisfy the required smooth peeling. It is preferable to keep an extension ratio substantially within 5% in view of recovery of the extension. The polymer layer is coagulated while moving downwardly with the progress of the release substrate belts and peeled from them by means of pinch roll (49) forming a film. Then, the resultant polymer film is subjected to a complete elimination of the solvent, passed through a dryer (40) and rolled up.

In the present apparatus, the coagulating bath is filled with water. The addition of inorganic salts and the mixing of the solvent of the polymer solution are effective to result in a distribution of uniform micropores throughout the film. Further, steam may be used for a coagulant. In this respect, combined use of water and steam can shorten the distance of the tenter. However, it is important that a polymer layer must be soaked in a coagulating bath to effect the complete elimination of the solvent before drying.

EXAMPLE 1

Filaments of 5 deniers were obtained by melt-spinning polyethylene terephthalate prepared by a reaction of terephthalic acid with ethylene glycol. The filaments were twisted into yarns having a thickness of 125 deniers to be used as warps. Also yarns having a thickness of 210 deniers were prepared by twisting the filaments to be used as woofs. A cloth was obtained by plainly weaving the thus prepared yarns in a density of 116/inch for warps and 80/inch for woofs. The cloth was then passed between a pair of rolls having a linear pressure of 25 kg./cm. and beaten by introducing therein saturated steam having a pressure of 15 kg./cm. to result in a smooth surface as illustrated in FIG. 1. Thus the release substrate of the present invention was prepared. As a polymer, an NCO-terminated prepolymer was prepared from 1 mole of poly-(ethylene, tetramethylene) glycol adipate having an OH value of 110 and 2 moles of diphenylmethane-4,4'-diisocyanate.

The prepolymer thus obtained was subjected to chain extension in DMF using xylenediamine to result in a polyurethane elastomer. The polyurethane elastomer (concentration of solid matter: 20%) was coated in a thickness of 0.8 mm. on the above-mentioned release substrate using a knife-coating apparatus and the coated layer was introduced into water of 50° C. for coagulation for 10 minutes. The coated layer was further soaked in a water bath for 30 minutes to completely eliminate DMF and then a porous film of polyurethane prepared in the manner described above was peeled from the release substrate. The peeling strength was 135 g./5 cm. and the film was peeled smoothly. The same operations were repeated for 10 times without losing the initial peeling strength of 135 g./5 cm. (the peeling strength was measured according to JIS K-7667).

The smoothness in peeling ability of the present release substrate was compared with that of the conventional non-porous release substrate and the result was as shown in the Table 3.

Further, to distinctly define the release substrate used in the present invention, a comparative test was conducted using other kinds of fibers as a release substrate for the production of a porous film by a wet process. Yarns of Vinylon (produced by Kuraray Co., Ltd.), nylon 6 and cotton having a thickness of 120 deniers were respectively plainly woven in a density of 80/inch for warps and 100/inch for woofs and the resulted woven fabrics were treated in the same manner as described above.

It was tried to prepare porous films by a wet process using the thus obtained release substrates. However, the Vinylon and cotton cloths had the very poor ability to peel off the film and the films were often broken upon forcibly peeling the substrates. Also a release substrate made of nylon 6 was not preferable for the production of a film since it extended remarkably in water. Further, it was observed that all of these three release substrates were damaged by DMF which was the main solvent of the polymer. Therefore, they could not stand being used for several times and could not be used in an apparatus.

On the other hand, yarns having a thickness of less than 80 deniers prepared by twisting the above-mentioned polyethylene terephthalate fibers were woven in a density within the range defined above to obtain a cloth. The resultant cloth was used as the release substrate. In this case, however, it was useless as a release substrate because it was not resistant to shrinking which occurred upon coagulation of the polymer, resulting in a wrinkled film. Further, when the release substrate was prepared from thick yarns of more than 260 deniers in a density within the range defined above, the meshes of the fabric appeared on the surface of the polymer layer while the coagulation proceeded. Further, giant pores were formed inside the layer because the layer was coagulated while involving air contained in the cloth within the film layer. Thus the cloth revealed the same defect possessed by the direct method. The porous film obtained above was laminated with heating with a cotton plain weave cloth using a binder to result in a synthetic leather.

EXAMPLE 2

A release substrate was prepared by plainly weaving long filaments of polyethylene terephthalate having the same quality as in Example 1 and a thickness of 4 deniers in a density of 121/inch for warps (100 deniers) and 104/inch for woofs (100 deniers), and smoothing the surfaces of the resulting cloth in the same manner as described in Example 1.

Polymer solutions having various composition ratios of calcium carbonate powders were prepared using a polyester urethane elastomer obtained from a polyester diol and a polyisocyanate as polymer component, DMF as a solvent and calcium carbonate powders having an average particle size of $10\mu$ as an additive. The polymer solutions were respectively coated on the release substrate prepared above and coagulated in water having a temperature of 60° C. for 5 minutes. After the porous film thus formed was peeled from the release substrate, it was soaked in water for 10 minutes to effect solvent elimination and dried at 100° C. for 15 minutes under the conditions of slight tension to obtain a film.

The composition ratios and the physical properties of the films are shown in the next table.

TABLE

| Composition ratio of calcium carbonate [a] | 0% | 10% | 20% | 30% | 40% | 50% | 60% |
|---|---|---|---|---|---|---|---|
| Moisture permeability (g./m.²/24 h.)[b] | 2,250 | 2,500 | 2,600 | 3,000 | 3,200 | 3,400 | 3,400 |
| Void content (percent)[c] | 67 | 70 | 60 | 65 | 60 | 63 | 65 |
| Tensile strength (kg./cm.²) | 40 | 42 | 45 | 50 | 50 | 48 | 30 |
| Flexo,[d] 50,000 times | Possible | Possible | Possible | Possible | Possible | Possible | Impossible |
| De Mattia,[e] 100,000 times | do | do | do | do | do | do | Do. |
| Appearance | Moderately gigantic pores | Moderately gigantic pores | Moderately gigantic pores | Slightly gigantic pores | Uniform micropores | Uniform micropores | Uniform micropores |

[a] See the following:
$$\frac{\text{weight of calcium carbonate}}{\text{weight of polymer solids} + \text{weight of calcium carbonate}} \times 100(\%).$$
[b] JIS K-6549.
[c] See the following:
$$\frac{\text{apparent volume} - \text{actual volume}}{\text{apparent volume}} \times 100(\%).$$
[d] 50,000 times flex resistance test according to JIS K-6545 using Flexo meter.
[e] De Mattia cold resistance flexing: at −10° C.

It is revealed from the foregoing table that the preferred composition ratio of the calcium carbonate is in the range of 40 to 50% in every respect including moisture permeability, tensile strength, appearance of the film, etc. The porous film obtained was laminated with heating with a non-woven fabric prepared from polyester short fibers using a binder (to an OH terminated polymer having a molecular weight of 20,000 obtained by the reaction of polyethylene glycol having a molecular weight of 2,000 with toluene diisocyanate was added a polyfunctional isocyanate compound and the resulting mixture was dissolved in a mixed solvent of ethyl acetate and toluene). The thus prepared synthetic leather had a flexural rigidity of 15 mg. cm.× $10^3$ (according to ASTM D-1388 55 T: flexural rigidity testing method) and a tensile strength of 4.0 kg./mm. (according to JIS K-6732).

As a control, a polymer solution containing calcium carbonate in a mixing ratio of 40% was directly coated on the above-mentioned non-woven fabric and coagulated by the wet process under the same conditions to obtain a synthetic leather. However, it took a long time for drying, the product showed an inferior moisture permeability of 2600 g./m.²/24 h. and gigantic pores remained in the film. Further, the product had a tensile strength of as little as 2.7 kg./mm. because the polymer permeated into the non-woven fabric, showed inferior result in flexural rigidity test and entirely lacked in flexibility.

EXAMPLE 3

(1) 45 parts as solid of the same polyurethane elastomer as in Example 2, 45 parts of calcium sulfate $$(CaSO_4 \cdot \tfrac{1}{2} H_2O,$$

specific gravity, 2.96; particle size, $10\mu$) (corresponding to the mixing ratio of calcium sulfate of 50%) and 160 parts of DMF.

(2) 45 parts as solid of the same polyurethane elastomer as in Example 2, 45 parts of magnesium carbonate  ($MgCO_3$, specific gravity, 2.8; particle size, 10) (corresponding to a mixing ratio of magnesium carbonate of 50%) and 160 parts of DMF.

(3) 45 parts as solid of the same polyurethane elastomer as in Example 2, 45 parts of aluminum hydroxide ($Al(OH)_3$, specific gravity, 2.423, particle size, 8.6) (corresponding to a mixing ratio of aluminum hydroxide of 50%) and 160 parts of DMF.

Films were formed from the polymer solutions (1), (2) and (3) in the same manner as in Example 2. As the result, the films obtained had physical properties shown in the table below. A control film was prepared by coating a polyurethane elastomer containing no inorganic particles on a glass plate and coagulating the coated layer in water.

Each of these films was heat-laminated with a cloth, adhering the peeled side to the cloth surface using a binder.

As a control, the Solution C was directly coated on a cotton cloth and was subjected to similar treatment as described above. The resulting synthetic leather had the

TABLE

| Additives | (1) Calcium sulfate | (2) Magnesium carbonate | (3) Aluminum hydroxide | (4) Control |
| --- | --- | --- | --- | --- |
| Moisture permeability (g./m.$^2$/24 h.) | 2,500 | 3,090 | 2,800 | 1,800. |
| Void content (percent) | 77 | 76 | 65 | 60. |
| Tensile strength (kg./cm.$^2$) | 104 | 45 | 60 | 40. |
| Flexo, 50,000 times | Possible | Possible | Possible | Possible. |
| De Mattia, 100,000 times | do | do | do | Do. |
| Appearance of section (by microscope) | Uniform micropores | Uniform micropores | Uniform micropores | Gigantic pores present. |

The thus obtained film (1) was laminated with a non-woven fabric, (2) with a cotton knit fabric and (3) with a cotton twill fabric and used as synthetic leathers respectively for shoes, clothing and furniture.

EXAMPLE 4

A urethane polymer solution having a concentration of 20% was prepared by reacting a prepolymer prepared from polyethylene butylene adipate and diphenylmethane diisocyanate with xylylene diamine in DMF. To 400 parts of the solution were added 240 parts of DMF and 35 parts of a copolymer of vinyl chloridevinylidene chloride, and the mixture was subjected to dissolution with stirring to prepare a polymer solution. The polymers contained in the resulted solution were incompatible with each other. The thus prepared polymer solution was opaque and had a viscosity of 2,000 cps./30° C. The viscosity was increased to 5,000 cps./30° C. after two days though. (Solution A.)

Likewise, a polymer solution having a concentration of 20% was prepared by reacting a prepolymer prepared from polybutyren adipate having a molecular weight of 1,000 and diphenylmethane diisocyanate with xylenediamine in DMF. To 400 parts of the solution were added 240 parts of DMF and 35 parts of a copolymer of vinyl chloridevinylidene chloride and the mixture was subjected to dissolution with heating to prepare a polymer solution. The polymers in the resulted solution were compatible with each other. The thus prepared polymer solution was transparent and had a viscosity of 2,500 cps./30° C. (Solution B.)

Further, a polymer solution was prepared by mixing 340 parts of Solution A and 60 parts of Solution B. (Solution C.) Increase in viscosity was not observed in Solution C.

A fabric was woven in a density of 92/inch for warps and 76/inch for woofs using long filaments of polyethylene terephthalate of 4 deniers, twisted into yarns of 210 deniers for warps and woofs, and was smoothed on the surfaces. The resulting cloth was used as a release substrate.

Each of the polymer solutions prepared above was coated on the release substrate in a thickness of 1.0 mm. and coagulated in hot water having a temperature of 40° C. for 2 minutes. Then, the coagulated layers were washed with water for 30 minutes, treated in hot water having a temperature of 80° C. for 10 minutes, and dried after peeling from the substrate.

The properties of the respective films thus obtained are shown in the table below.

Especially, the film obtained from the Solution C had excellent properties. (The film prepared from the solution A also showed excellent values of physical properties but the solution was unstable and was not easily operable.)

TABLE

| Solution | Thickness (mm.) | Weight (g./m.$^2$) | Specific gravity | Moisture permeability (g./m.$^2$/24h.) | Smoothness of the film |
| --- | --- | --- | --- | --- | --- |
| A | 0.32 | 277 | 0.865 | 4,000 | Excellent. |
| B | 0.40 | 293 | 0.733 | 1,400 | Poor. |
| C | 0.38 | 208 | 0.547 | 3,300 | Excellent. | same disadvantages possessed by the control film in Example 2.

EXAMPLE 5

A prepolymer was obtained by mixing 1 mole of polyethylene propylene adipate having an average molecular weight of 1600 with 2.03 moles of diphenylmethane diisocyanate and stirring the mixture with heating at 80° C. for one hour. Then the prepolymer was subjected to chain extention in dimethyl formamide (DMF) using 0.98 moles of xylene diamine to prepare a urethane polymer solution having a concentration of 20% and a viscosity of 5,000 cps. To 700 parts of the polymer solution was added 35 parts of polyvinyl chloride having a degree of polymerization of 700 while adding 240 parts of DMF to the polymer solution and the mixture was well mixed while being dissolved to obtain an opaque, incompatible polymer solution having a viscosity of 3,700 cps. (Solution A.)

Likewise, a prepolymer was prepared from polybutylene adipate having a molecular weight of 1,000 and diphenylmethane diisooyanate. The prepolymer was reacted with xylene diamine in DMF to form a urethane polymer solution having a concentration of 20% and a viscosity of 4,900 cps. Upon mixing 700 parts of the urethane polymer solution, 35 parts of polyvinyl chloride having a polymerization degree of 700 and 240 parts of DMF, a transparent polymer solution having a viscosity of 2,500 cps. was obtained. (Solution B.)

Further, a polymer solution was prepared by mixing 700 parts of the Solution A and 300 parts of the Solution B. (Solution C.) A synthetic leather was obtained by using the above Solution C in the similar manner as in Example 4.

EXAMPLE 6

80 parts of DMF, 20 parts of polyurethane resin used in Example 1, 20 parts of 325 meshes (43$\mu$) pulp powders dyed black and 3 parts of carbon black were mixed with stirring. The mixture was then passed through a paint roll to effect a complete mixing up. The thus obtained polymer solution was coated on the release substrate used in Example 1 in a thickness of 0.6 mm. The coated layer was left standing in air for 5 minutes and coagulated to form a porous film by soaking in hot water having a temperature of 65° C. for 5 minutes. The resulting coagulated porous film was subjected to a solvent elimination treatment in hot water having a temperature of 80° C. for 20 minutes, peeled from the release substrate, and dried in a hot wind dryer at 110° C. to 120° C.

The obtained polymer film was microscopically uniform. When the film was ground on the surface in 0.1 mm. thickness with a No. 240 sandpaper, there appeared a rough, gray surface.

However, after further brushing, the film was revealed to have a suede-like black surface with soft touch. A synthetic leather was obtained by laminating the film with a cotton knit fabric with heating. The suede-like synthetic leather had an enhanced strength as compared with the conventional ones prepared by forming honeycomb-like voids within the film layer and had a soft touch.

EXAMPLE 7

A polymer solution was prepared by mixing 80 parts of DMF, 5 parts of cyclohexane, 15 parts of the same polyurethane resin as used in Example 1, 3 parts of polyvinyl chloride having a degree of polymerization of 700 and 5 parts of a pigment (red iron oxide) to make a solution and uniformly dispersing 20 parts of 80 mesh-pass (175μ) cotton flock in the solution.

A suede-like synthetic leather was obtained from the polymer solution in the similar manner as in Example 6. The synthetic leather had an excellent touch and showed sufficient resistance in a flex test and an abrasion test.

EXAMPLE 8

4 denier polyethylene terephthalate filaments were twisted into yarns having a thickness of 100 deniers. The yarns were plainly woven in a density of 130/inch for warps and 110/inch for woofs and the obtained cloth was pressed from both sides with heat at 200° C. to give smooth surfaces. Two sheets of the cloth were equipped in an apparatus as illustrated in FIG. 2 as release substrates.

On the other hand, a polyurethane solution having a concentration of 20% was prepared by dissolving in DMF a polyurethane elastomer obtained by polymerizing 17 parts of polybutylene adipate, 3 parts of 1,4-butane diol and 11 parts of diphenylmethane diisocyanate in DMF. Then, a polymer solution was prepared by dissolving 150 parts of the polyurethane solution, 5 parts of tripolymer of 6, 66 and 610 nylons in a ratio of 1:1:1, and 10 parts of a pigment in 100 parts of DMF with stirring and heating.

A film was prepared from the polymer solution using an apparatus as illustrated in FIG. 2 under the conditions where the knife coating means 13 had a thickness of 1 mm., the temperature of the coagulating bath 14 was 80° C., hot water having a temperature of 30° C. was used as the water-washing bath 8 and the advancing speed of the polymer layer was 10 m./min. It took one hour from coating to the completion of rolling through coagulation and drying (200° C.). The obtained film had moisture permeability and flexibility and was soft with uniform microporous voids but without formation of a surface skin layer.

The film was laminated with a cotton tricot cloth using NBR emulsion as a binder to be used as a synthetic leather for clothing.

EXAMPLE 9

A film was prepared according to the method described in Example 8 using the Solution C in Example 4. The film was laminated with a cotton knit fabric to be used as a synthetic leather for clothing.

EXAMPLE 10

5 denier polyethylene terephthalate filaments were twisted into yarns having a thickness of 125 deniers. A plainly woven fabric was prepared from the yarns in a density of 116/inch for warps and 80/inch for woofs and passed between a pair of rolls heated by introducing a saturated steam of 15 kg./cm. and having a linear pressure of 25 kg./cm. to give smooth surfaces. Two sheets of the resulting cloth were used as the release substrate belts 2 and 3 of FIG 2. The polymer solution of Example 2 containing calcium carbonate in a mixing ratio of 40% was made into a film according to the apparatus of FIG. 2 under the conditions that the thickness of the coating means 13 was 1 mm., the temperature of the coagulating bath 14 was 80° C. and hot water having a temperature of 30° C. was used as a coagulating bath. The advancing speed of the polymer layer was 10 m./min.

The resultant film had a moisture permeability of 3,600 g./m.²/24 h. and a high strength, and was soft with uniformly microporous voids but free from a surface skin layer. The film was laminated with a cotton cloth to be used as a synthetic leather for sandals.

EXAMPLE 11

A film was prepared according to the apparatus illustrated in FIGS. 4 to 6 using the polyurethane elastomer (concentration: 20%) used in Example 1. In this case, the release substrate used in Example 1 was also used as an endless belt. The polymer solution was fed from the polymer solution feeding means onto the thickness controlling heads. The thickness controlling heads were adjusted so that the thickness of the layer be 1 mm. The thickness of the liners were, accordingly, adjusted to also 1 mm. The endless belts received tension in their horizontal direction shown in FIG. 5 by the tenters (a strength to stretch the substrate by 5%).

Further, under these conditions the advancing speeds of the endless belts, tenters and liners were maintained respectively at 1 m./min. and hot water (80° C.) was used as a coagulating bath. The coagulation of the polymer proceeded while the polymer layer was advanced downwardly and the coagulation was completely finished when the polymer layer reached to the pinch roll 9. Here, the release substrate belts supporting the film were peeled from the film, and the unsupported porous film was subjected to elimination of the solvent remained within the film and was sent out of the coagulating bath. Then, the porous fim was dried in the dryer 10 at 200° C. and rolled up.

The thus obtained film maintained the initially filled thickness of 1 mm. The film was laminated with a cotton twill fabric using SBR emulsion as a binder to be used as a synthetic leather for an upholstery. The synthetic leather had an excellent moisture permeability and touch and a chair upholstered therewith did not give a stuffy feeling and was comfortable to sit in.

EXAMPLE 12

The method described in Example 10 was carried out using the solution C of Example 3 except that the initially filled thickness was adjusted to 1.5 mm. and accordingly liners having a thickness of 1.5 mm. were used. After coagulation and drying in the same manner, a porous film having a thickness of 1.5 mm. was obtained. The film was laminated with an interlocking knit fabric to be used as a synthetic leather for sandals.

What is claimed is:

1. A method of producing synthetic leather comprising preparing a release substrate by twisting long filaments of polyethylene terephthalate having a thickness of 10 deniers or less to obtain yarns having a thickness of 80 to 200 deniers, plainly weaving said yarns into cloth in a density of at least 80/inch for warps and at least 70/inch for woofs and pressing the surfaces of the resulting cloth in the presence of heat at a temperature lower than the melting point of said cloth; applying a polymer solution onto the surface of the release substrate in the form of a layer; coagulating the polymer layer by soaking in a liquid which is compatible with a solvent of the polymer solution and nonsolvent for the polymer; removing the solvent from the polymer layer so as to form a porous film by interchanging in the coagulating bath the coagulating liquid and said solvent directly on the upper surface side of said polymer layer and through meshes of said cloth on the cloth side of said polymer layer; peeling the porous film from the release substrate; drying said film; and laminating the same with a fibrous base material.

2. The method according to claim 1, characterized in that the non-solvent liquid is water.

3. The method according to claim 1, wherein the polymer is a polyurethane elastomer.

4. The method according to claim 1, wherein the polymer solution comprises a polyurethane elastomer, an additive selected from the group consisting of calcium carbonate, alumina, silica, magnesia, magnesium carbonate, magnesium hydroxide, calcium sulfate, graphite and titanium oxide having a particle size of up to 20μ and dimethyl formamide, the amount of said additive being 30 to 50% based on the total solids.

5. The method according to claim 1, wherein the polymer comprises a combination of a polymer of vinyl chloride or the derivatives of vinyl chloride, a polyurethane elastomer which is compatible with said vinyl polymer in one solvent and a polyurethane elastomer which is incompatible with said vinyl polymer in one solvent.

6. A method of producing suede-like synthetic leathers, characterized by coating a polymer solution comprising a polyurethane elastomer, a powder selected from pulp, polyethylene, polypropylene, natural leather, rayon and cotton having a particle size of 40 to 200μ and DMF on a release substrate, said release substrate prepared by twisting long filaments of polyethylene terephthalate having a thickness of 10 deniers or less to obtain yarns having a thickness of 80 to 200 deniers, plainly weaving said yarns into cloth in a density of at least 80/inch for warps and at least 70/inch for woofs and pressing the surfaces of the resulting cloth in the presence of heat at a temperature lower than the melting point of said cloth, coagulating the coated layer in a porous state by soaking in water, peeling the film layer from the substrate, drying the same, grinding either surface of the obtained porous film and laminating the other surface with a fibrous substrate.

References Cited
UNITED STATES PATENTS

| | | | |
|---|---|---|---|
| 3,573,121 | 3/1971 | Fukada et al. | 161—406 |
| 3,669,792 | 6/1972 | Mitsukawa et al. | 156—249 |
| 3,567,535 | 3/1971 | Noda et al. | 156—249 |
| 3,483,015 | 12/1969 | Fukushima et al. | 161—DIG. 002 |
| 2,842,473 | 7/1958 | Oberly et al. | 161—DIG. 002 |

CHARLES E. VAN HORN, Primary Examiner

F. FRISENDA, JR., Assistant Examiner

U.S. Cl. X.R.

156—231, 246, 249